(12) United States Patent
Wallace et al.

(10) Patent No.: US 8,209,338 B2
(45) Date of Patent: Jun. 26, 2012

(54) INTEREST-GROUP DISCOVERY SYSTEM

(76) Inventors: David Robert Wallace, San Francisco, CA (US); Marilynn Klamkin, San Francisco, CA (US); Kali Donovan, San Diego, CA (US)

( * ) Notice: Subject to any disclaimer, the term of this patent is extended or adjusted under 35 U.S.C. 154(b) by 289 days.

(21) Appl. No.: 12/651,447

(22) Filed: Jan. 1, 2010

(65) Prior Publication Data
US 2010/0174724 A1    Jul. 8, 2010

Related U.S. Application Data

(60) Provisional application No. 61/204,556, filed on Jan. 8, 2009.

(51) Int. Cl.
*G06F 7/00* (2006.01)
(52) U.S. Cl. .......... 707/749; 707/751
(58) Field of Classification Search .......... 707/749, 707/751, 758
See application file for complete search history.

(56) References Cited

U.S. PATENT DOCUMENTS

| | | | | |
|---|---|---|---|---|
| 5,787,430 A | * | 7/1998 | Doeringer et al. | 1/1 |
| 7,979,453 B2 | * | 7/2011 | Jagannathan | 707/758 |
| 2008/0071769 A1 | * | 3/2008 | Jagannathan | 707/5 |

* cited by examiner

*Primary Examiner* — Hung T Vy

(57) ABSTRACT

A method of social networking is disclosed in which users may indicate areas of interest to them and/or search for other users with the same or similar interests. Users may specify one or more areas of interest to them and enter those interests in a database, by means of a list of "tags" or keywords, called a taglist. The values of the tags may be weighted. A user wishing to find other users with similar interests may input a search taglist which is compared with the other taglists stored in the database, and a list of the users with the closest matching taglists is returned. The method may also be used to characterize documents, projects, media files or other data objects, so that such items may be searched in similar fashion.

14 Claims, 3 Drawing Sheets

INTEREST-GROUP DISCOVERY SYSTEM

The present application claims the benefit of U.S. Provisional Patent Application No. 61/204,556, filed on Jan. 8, 2009.

FIELD OF THE INVENTION

The present invention relates generally to social networking. More specifically, the invention relates to methods for creating a database of the interests of users, so that users may search for others with the same or similar interests.

BACKGROUND OF THE INVENTION

In recent years social networking has become very popular as a way of allowing people to connect and communicate with each other, and share both information about themselves and digital content through the internet and over great distances. Sites such as Facebook and MySpace allow users to post information about their interests and activities for others to read, and to read the information that others have posted. Thus, users are able to provide information to a large number of people by posting only once, rather than having to communicate directly with each other person with whom it is desired to share information.

However, these types of sites are typically set up such that people must establish a connection with one another before they may view each other's information, so that communication and sharing information is generally limited to being between people who already know each other. Thus, while these sites allow people to find out about the interests of people they already know, they do not allow people to find others based solely upon their common interests.

A number of dating sites allow people to indicate interests, and provide various ways of matching up strangers. However, these sites expressly include demographic data (sex, age, race, marital status, education, employment, etc.) and physical attributes as part of their matching algorithms. In addition to this, it is believed that the scope and type of matching is limited, for example allowing a user only to designate one or more of a small number of very broad categories; for example, Yahoo Personals lists such categories as arts, family, travel, cooking, outdoor activities, playing sports, etc. As a result, these sites are typically not specific enough to be well suited to finding people of common specific interests, even ignoring the potential presumptions of romantic interest by their users.

While the internet may make it easier in some ways to find people of similar interests, for example by searching for a club, organization or user forum related to a specified subject, there does not appear to be any easily available means of searching for individuals who share an interest with a user.

SUMMARY OF THE INVENTION

The present invention allows a form of social networking in which people interested in certain subjects may easily and quickly find others who have the same or similar interests. According to the present invention, each person desiring to specify one or more areas of interest to them may have those interests entered in a database. A person may then search the database to find others who have indicated in the database that they have similar interests to the searcher. This allows people who otherwise do not know each other but share one or more of the same interests to find and communicate with one another.

Users may indicate an area of interest primarily by specifying a list of "tags" or keywords, called a taglist, which describes the area of interest to the user. Multiple interests are represented by multiple taglists, one taglist for each area of interest. The taglists for multiple users are stored in a taglist database.

In addition to entering one or more taglists of their own interests, users may enter a search taglist indicating an area of interest in which they wish to find other users with similar interests. The system will compare the search taglist selected by the user with the other taglists stored in the database and return a list of the closest matching users, i.e., those with the closest matching taglists.

If desired, some or all of the users who are the closest matches to a given search taglist can create a common interest group. Those users in the interest group who are online at the same time can communicate, via IM, voice, video connection or other communication means; such communications among persons who are online are known in the art. Those users in the interest group who are not online at the time can be invited to join discussions at other times via an email, voicemail, forum or chat room posting or other message. Interest areas are not limited to hobbies, but may also include such things as support groups, shopping co-ops, student or parent groups, groups of traveling companions, among many examples.

In other environments, such as an academic, professional, research or enterprise environment, users may enter their areas of expertise or interest into the database, and a search taglist may be used to help locate persons in the database having a desired expertise by focusing the matching search on an appropriately narrow area. In other embodiments, it may be desirable to locate projects, documents or media files (pictures, voice or video files, etc.) based on the interest areas to which they are related. A document, file or project in many cases may be represented by a single taglist, although it may require more than one taglist to adequately cover its contents.

The use of taglists enables a user to easily and greatly refine an interest area or a search by specifying interest areas that range from very broad to very narrow. If matching search for a given taglist does not return a suitable set of people, then the taglist defining the interest area can be adjusted and the matching search can be repeated until a group of people that is satisfactory to the searching user is found. At that point the matching group may be turned into a formal interest group if desired.

In one embodiment of the present invention, a method of adding a new keyword list to a hierarchical database containing a plurality of stored keyword lists, the database containing nodes corresponding to the keywords of the stored lists, by inserting the new list at the point of its closest match to an existing list, comprises comparing the first keyword of the new list to the nodes at a first level of the database to determine whether the first keyword is close enough to an existing node at the first level for the new list to be placed within the existing node; if the first keyword is close enough to fall within an existing node at the first level, repeating the comparison for the next keyword to the nodes at the level which is directly under the existing node; repeating the comparison for each subsequent keyword at each subsequent level until a keyword is not close enough to be placed within an existing node; and when a keyword is not close enough fall within an existing node at the level at which it is compared, creating a new node corresponding to the keyword directly under the last node for which a keyword was close enough to be placed within the node.

In another embodiment, a method of adding a new weighted keyword list to a hierarchical database containing a plurality of stored weighted keyword lists, the database containing nodes corresponding to the weighted keywords of the stored lists, by inserting the new list at the point of its closest match to an existing list, comprises representing each weighted keyword list as a vector; comparing the first element of the new keyword vector to the nodes at a first level of the database to determine whether the first element is close enough to an existing node at the first level for the new list to be placed within the existing node; if the first element is close enough to fall within an existing node at the first level, repeating the comparison for the next element to the nodes at the level which is directly under the existing node; repeating the comparison for each subsequent element at each subsequent level until an element of the new keyword vector is not close enough to be placed within an existing node; and, when an element of the new keyword vector is not close enough fall within an existing node at the level at which it is compared, creating a new node corresponding to the element directly under the last node for which an element was close enough to be placed within the node.

In still another embodiment, a method of searching a hierarchical database of keyword lists for lists matching a search keyword list, the database containing nodes corresponding to the keywords of the stored lists, comprises comparing the first keyword of the search list to the nodes at a first level of the database to determine whether any existing nodes match the first keyword; if one or more nodes match the first keyword, repeating the comparison for the next keyword to the nodes at the level which is directly under the nodes matching the first keyword; repeating the comparison for each subsequent keyword at each subsequent level until the nodes closest to the search list are located; and returning a list of the located nodes.

In yet another embodiment, a method of searching a hierarchical database of weighted keyword lists for lists matching a search weighted-keyword list, the database containing nodes corresponding to the weighted keywords of the stored lists, comprises comparing the first weighted keyword of the search list to the nodes at a first level of the database to determine whether any existing nodes match the first weighted keyword; if one or more nodes match the first weighted keyword, repeating the comparison for the next weighted keyword to the nodes at the level which is directly under the nodes which match the first keyword; repeating the comparison for each subsequent weighted keyword at each subsequent level until the nodes closest to the search list are located; and returning a list of the located nodes.

DETAILED DESCRIPTION OF THE INVENTION

Figure 1:
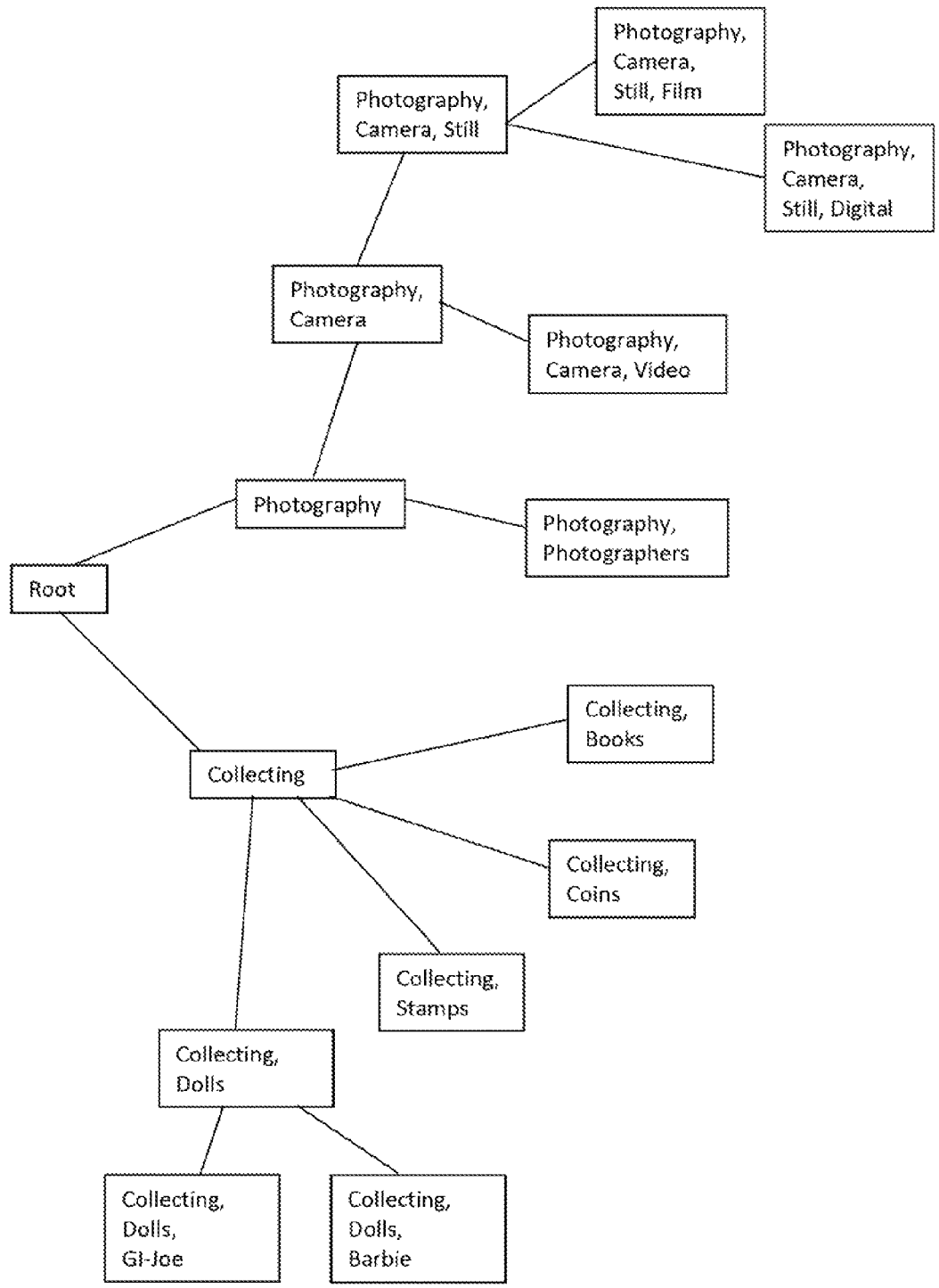
FIG. 1 illustrates a data tree according to the present invention.

In the present invention, people may indicate one or more areas of interest to them and have those interests entered into a database so that they or others may locate people having interests similar to their own. A user of a system or method according to the present invention specifies an area in which they are interested by means of a taglist, which is a list of keywords or attributes that describes the area of interest. For example, a person interested in collecting Barbie dolls might designate this interest by the taglist (collecting, dolls, Barbie), while one interested in the use of catalysts in chemical reactions might use the taglist (chemistry, reactions, catalysts) to designate such area. Interest areas can be broad or narrow. In general, a more narrow interest area will have many attributes, while a broad interest area will have relatively fewer attributes; for example, one interested in collecting dolls in general may omit the attribute "Barbie" from the taglist and use the list (collecting, dolls).

The taglists generated by users who wish to indicate their interests to others are stored in a taglist database. The taglist database consists of nodes, where each node has internal fields to hold an associated taglist vector as well as fields used to link nodes together to form the tree-like database structure. For each new taglist submitted indicating a new user and/or new interest area, a computer processor or system with access to the database will search the database by comparing the new taglist to those already in the database, and will store the new taglist near others having identical or similar keywords by determining the "closest" fit as explained herein. New taglists may be entered directly into the computer or system where the database is located, or may be added through client websites which accept the taglists and forward them to a database server.

To find other users with similar interests, a user may enter a search taglist describing the area of interest to them. A search taglist may be the same as a taglist submitted by a user for entry in the database, or may be different, and need not be submitted by a person who has entered a taglist into the database. As with entering new taglists, search taglists may be entered directly into the database system, or may be entered into a client website and then forwarded to the database server, and the results returned to the client website. For example, a user seeking others with similar interests in books may be able to enter a search taglist through a bookseller's website.

When a search taglist is entered, similarly to determining where to locate a new taglist, the system will search the database by comparing the search taglist with the other taglists stored in the taglist database and return a list of other users who have the "closest" matching taglists. Where appropriate, the system can provide a distance measure between any two taglists, allowing a consistent comparison of the "closeness" of the interest areas represented by each taglist to the search taglist.

The specificity, or lack thereof, of the search taglist will of course impact both the number and specificity of results. For example, a general keyword such as "health" is likely to generate a very large number of people who have input that tag as part of their own taglists and is thus unlikely to be useful or acceptable to the user. The user may add additional tags such as "sports injuries" to narrow the results. A further tag such as "runners' injuries" will narrow the search still further and may provide a list of people who more closely match the user's area of interest. The user may add still further tags such, perhaps "New York City," and may or may not see further refinement of the results that is useful. A user may keep adding new tags as they please in order to find the most useful match for their purposes.

Similarly, in the case of the bookseller, a user accessing the bookseller's website may start with a search for the taglist "mystery novels." A list of people in the database who have indicated such an interest will be returned. If the list is too long, or the user wishes to be more specific, more search tags may be entered to tailor the search to the user's specific interest, for example adding further tags such as "British" and "19$^{th}$ Century." By such refinements, a user is more likely to find people who closely match the user's area of interest, in this case 19$^{th}$ century British mystery novels. Once such people are identified, they may be notified of their common interest and may begin to communicate with one another immediately through the internet, mobile devices, etc.

For both new taglists and search taglists, in some embodiments users may be permitted to select their own taglists with no limitation on the words entered; however, as discussed below it may be more efficient to provide some kind of guide to users either describing the existing contents of the database or guiding the user to a list of words already in the database, so that they may select taglists that will more uniformly either fit into the database or be used to search the database.

The search may return all users with an identical interest, and/or may be structured to return users within a determined closeness. In some embodiments, the search will return all matching users. This allows people who otherwise do not know each other but share one or more of the same interests to find and communicate with one another.

One possible method of conducting a search and finding one or more matches to a search taglist from a user is to compare the search taglist to all taglists in the database. However, as with any search of a large database, using such a brute force method to compare the search taglist with each and every taglist in the database is very inefficient.

Instead, it is more efficient if the taglist database is organized around neighborhoods so that the search looks at only a smaller and more relevant part of the database. This is accomplished by using a tree structure, similar to how data is stored in a binary tree, but with more than two branches (or subtrees) allowed at each level or node. While binary tree databases only work for totally ordered binary sets of items, the present invention uses a database organization that is more like a general hierarchy.

FIG. 1 illustrates this difference; a binary tree is composed of a sequence of nodes each having only two branches, while the data tree of FIG. 1 may contain more than two branches at each node where appropriate. Thus, in FIG. 1, there is a node for collecting, and more specifically nodes for collecting dolls and still more specifically Barbie dolls, as mentioned above. There are also branches for collecting other dolls such as G.I. Joe dolls, and for collecting other items such as stamps, coins, books, etc.

At the same highest level (below the root) as collecting are other general categories as shown, for example photography and sports, and those other categories may also have their own sub-categories or branches, some of which are illustrated in FIG. 1. In a corresponding example based on geography, the topmost (root) level would represent the world, the next level down countries, then states or provinces, then counties, then cities, towns, blocks etc., until a specific address is reached.

Searching the taglist database for matched to a particular search taglist, or for the best location to enter a new taglist, involves selecting a node or neighborhood to search at each level of the tree. If the database is ordered as described, with the most general nodes at the top, and the taglists are similarly arranged with the more general keywords first, then a search will first compare the first tag or keyword to the highest level nodes to see if there is a match. If a match is found, the search will move to the next keyword, and to the branches or nodes underneath the matching one, and again seek a match. Thus, in general, at each level the system will try to select a more local neighborhood to zero in on the closest matches.

The process continues until the keywords of the search taglist have all been considered, or there is no match, at which point the system will take some action as described below, for example either returning the closest match or matches in the case of a search, or entering a user's interest into the database in the case of a new taglist.

In the case of a search, items that are deemed close enough to the search taglist to be returned as results of the search can be compared with the search taglist and the items ranked in order of closeness. If desired, only the closest items may be retained on a list of users and their interests that match the search taglist. For example, as discussed in more detail below, a distance constraint may be predetermined by the user that must be met for an item to be retained on the list, so that, for example, any taglists closer than the specified distance are put on the return list while those farther away than that distance are discarded from the list.

However, if the distance constraint is too small it is possible that no items will be considered close enough matches to a search taglist and thus nothing will be returned, i.e., no matching users will be found. In that case the search will need to be redone with a larger distance constraint if results, i.e., the identity of other users, are desired.

Alternatively, rather than specifying a closeness constraint, which in some instances may result in a list of users that is considered too big or too small for the searcher's purpose, a list-size constraint may be implemented that will limit the list returned to a predetermined number of the closest items. In this case, the system will rank the taglists in the database by how closely they match the search taglist and return a list of that predetermined size containing the users who most closely match the search taglist.

Note that returning all of the matching items of a query, or ranking all items in order of closeness, and then processing each returned item may require too much time (resulting in delays that users do not like) and/or processing power (requiring more and/or faster system hardware). To make the process more efficient it is possible to have the distance constraint built into the database or system, rather than specified by the user as above. In this case, the comparison to the distance constraint will be an integral part of the query, so that only if an item is within the distance constraint will the item be placed on the return list. The query will then return the matching list without any further processing or elimination of items being needed.

To keep time and hardware to a minimum, it will generally be more efficient to organize the tree representing the taglist database such that the more general nodes, i.e., categories, are at the top and the more numerous specific nodes at the bottom, as shown in FIG. 1(b). As above, since users may not be familiar with the structure of the database, in some embodiments the system may provide an interface which allows a user to either select pre-defined keywords for a taglist, for example from a pull-down menu or a displayed list that contains the keywords already in the database, or, if the user cannot find a keyword that represents the user's interest, to enter a new one.

Similarly, since a user may not enter taglists in an order from more general to more specific, an entered or search taglist may be made more uniform and efficient by having the system reorder attributes or add related attributes in an attempt to have the taglist more closely conform to the database structure. For example, attributes may be reordered so that storage in the database is independent of the order in which a user has entered attributes; for example, the taglists (Barbie, dolls, collecting) or (collecting, Barbie, dolls) should be either located in the same place (for new taglists), or the database searched in the same way (for search taglists), as the taglist (collecting, dolls, Barbie.) Similarly, attributes may be added to make a taglist conform to the structure of the database without changing the interest represented, i.e., if a taglist contains "camera," then matching will generally be easier and more uniform if the more general category "photography" is added by the system based upon the existing structure of the database before either storing or matching is done.

In some cases it may be convenient to combine other data attributes with the taglists in a general purpose relational database, and not solely in the tree-structure neighborhood format. Such other data attributes may include information about users, such as their names, addresses, contact information, etc., or identification of documents, media files (images, audio or video files), projects or other objects which may also have their associated "interest" or subject areas represented by taglists. This may be easily accomplished by adding fields to the relational database which correspond to tags or to nodes in the database, which may then be searched as a virtual tree. Such techniques are known to those of skill in the art. In such cases it is possible to apply a query that returns any database items that contain a taglist, whether they are user records or other files such as those described above.

Certain aspects of the invention will now be explained in more detail. Two basic operations should be provided for a neighborhood-oriented taglist database to serve the functions described herein, the insertion of new taglists into the database, and searching the database for the closest matches to a specified taglist. In addition, there should be some way to measure the closeness between two taglists at each level in the hierarchical database.

As above, a user may indicate an interest area via a taglist. Similarly, if it desired to add a document or other file, the area of a document's or other file's "interest area," i.e., its subject, may also be characterized by a taglist. Typically the tags, or keywords, will be found within the document itself, although this is not strictly required. The keywords may, for example, be assigned by a user characterizing the document.

In some instances, the interest area of a document or other file may be specified only by a taglist containing a set of keywords used once each, similar to the description of a user's interest area as above. However, a document or other file may use a keyword multiple times, in which case it is possible to count the number of times that each keyword is used, thus providing a count value for each keyword which indicates the relative importance of each keyword. In such a case the representation of an interest type of a document or other file may be a keyword vector in which each keyword has a vector position and a count indicating the relative importance of the keyword. For certain types of files this may be easy to accomplish by the use of automated programs such as those for text or voice recognition, which can count the number of times each word is used.

A taglist represents a vector, and each entry in the database may be represented by the vector that arrives at that entry, with the nodes of the database representing the components of the vectors. (Nodes may also be considered shortened vectors, i.e., each node represents the vector of tags that leads to that node.) The tags (or keywords) are represented to the user as strings, but internally they are given a numeric index corresponding to a position in a vector. The vector positions must be consistent internally even when tags may be introduced in different orders by different users, or in different versions of a system. There is thus a tag database that provides translations between tag positions and tag text labels, as well as translation functions to make different databases consistent. The length of the vectors will correspond to the number of keywords used in the whole database. When new keywords are introduced, the vector length will be extended (for all vectors) to provide slots for each new keyword. Each keyword gets a unique index into any vector. Managing the changing sizes of vectors is known to those of skill in the art.

If there are n unique keywords identified in the database, then the taglist vectors would have the following form, with x and y being vectors of the words identified, and each $x_i$ or $y_i$ being an integer count of the number of instances of use, for example in a document or file, of the keyword corresponding to that position in the vector:

$$x=(x_i \ldots x_n), y=(y_i, \ldots, y_n) \quad (Eq.\ 1)$$

In order to assist in measuring the closeness or similarity of documents, some numerical measures are defined. First, the "inner product" of two interest vectors is defined as follows:

$$x \circ y = \Sigma_{i=1}^n x_i y_i \quad (Eq.\ 2)$$

Next, the "norm" of a vector x is defined as the square root of $x \circ x$, represented as $\|x\|$. The distance between two vectors, x and y, would thus be represented as $\|x-y\|$.

For example, if we have two vectors $a=(1,0)$ and $b=(0,1)$, their closeness value is $$\|a-b\|=\|(1,-1)\|=\sqrt{(1+1)}=\sqrt{2} \quad (Eq.\ 3)$$

In the case of a user's interest area, the count of each keyword in a vector is limited to 0 or 1, and the vector corresponds to a set of keywords as above. In that case the closeness value defined above may still be calculated, or some alternative distance or closeness measures may be used. Given two vectors A and B that are viewed as set, one alternative measure could be the cardinality of the symmetric set difference, i.e.:

$$\mathrm{card}(A \cup B - A \cap B)$$

or the cardinality of the intersection:

$$\mathrm{card}(A \cap B)$$

The former measures how the sets are different while the latter measures how they are the same. Note that the intersection measure is reversed in that closer vectors or sets have a higher value. These two measures can be combined, for example by taking the cardinality of the symmetric difference minus the cardinality of the intersection:

$$\mathrm{card}(A \cup B - A \cap B) - \mathrm{card}(A \cap B)$$

or the cardinality of the symmetric difference divided by the cardinality of the intersection:

$$\mathrm{card}(A \cup B - A \cap B)/\mathrm{card}(A \cap B)$$

Again, the taglist database consists of a tree of keyword (or taglist) vectors, where each node is a component of a vector and there are potentially many children of a node, each another component of a vector. Each node in the tree has tree navigation values, such as parent and children, as well as the component value. A user-generated taglist is thus a vector which is placed in the tree if the same vector is not already present, at least initially as a leaf node as described below. A search taglist is a vector for which the closest matches are sought.

A closeness level value, C(level), may be specified for each level of the taglist database tree, which indicates how closely nodes may be located relative to one another; if two vectors representing nodes at a given level would be closer than the closeness level value, then they should be represented by the same node. These values may be determined by an initial level that is set at the root node and may be further determined by a level adjustment function ("LAF") defined such that if L is the closeness level for a particular node N, the closeness level L' of each child of node N is L'=LAF(L). The LAF may be reprogrammed for various purposes.

In some embodiments, the initial specification of LAF is set such that closeness level at a child node is ½ of the closeness level of the parent node to that node, i.e., L'=LAF(L)=L/2. Note, however, that this particular specification is only applied within the LAF itself so that the closeness levels of each node will only be calculated by invoking the LAF, thus allowing for modification as desired by simply modifying the LAF value.

Entering New User Interest Areas by Tag List Insertion

When a user wishes to indicate an interest area for inclusion in the database, the user provides a new taglist that is to be entered into the database. In this case, it should be determined where the new taglist is to be added to the database. In order to determine where to add the new taglist, it is determined at each level of the database, i.e., for each tag or component of the vector, whether the tag at that level is close enough to an existing node to fall within that existing node, and for any remaining tags in the taglist to be children nodes, or whether the tag is farther away from any existing nodes than the closeness level value C(level) at that level of the database and should result in the creation of a new node. (The situation in which the taglist is identical to a taglist already in the database is discussed below, but is very similar to this.)

Figure 2:
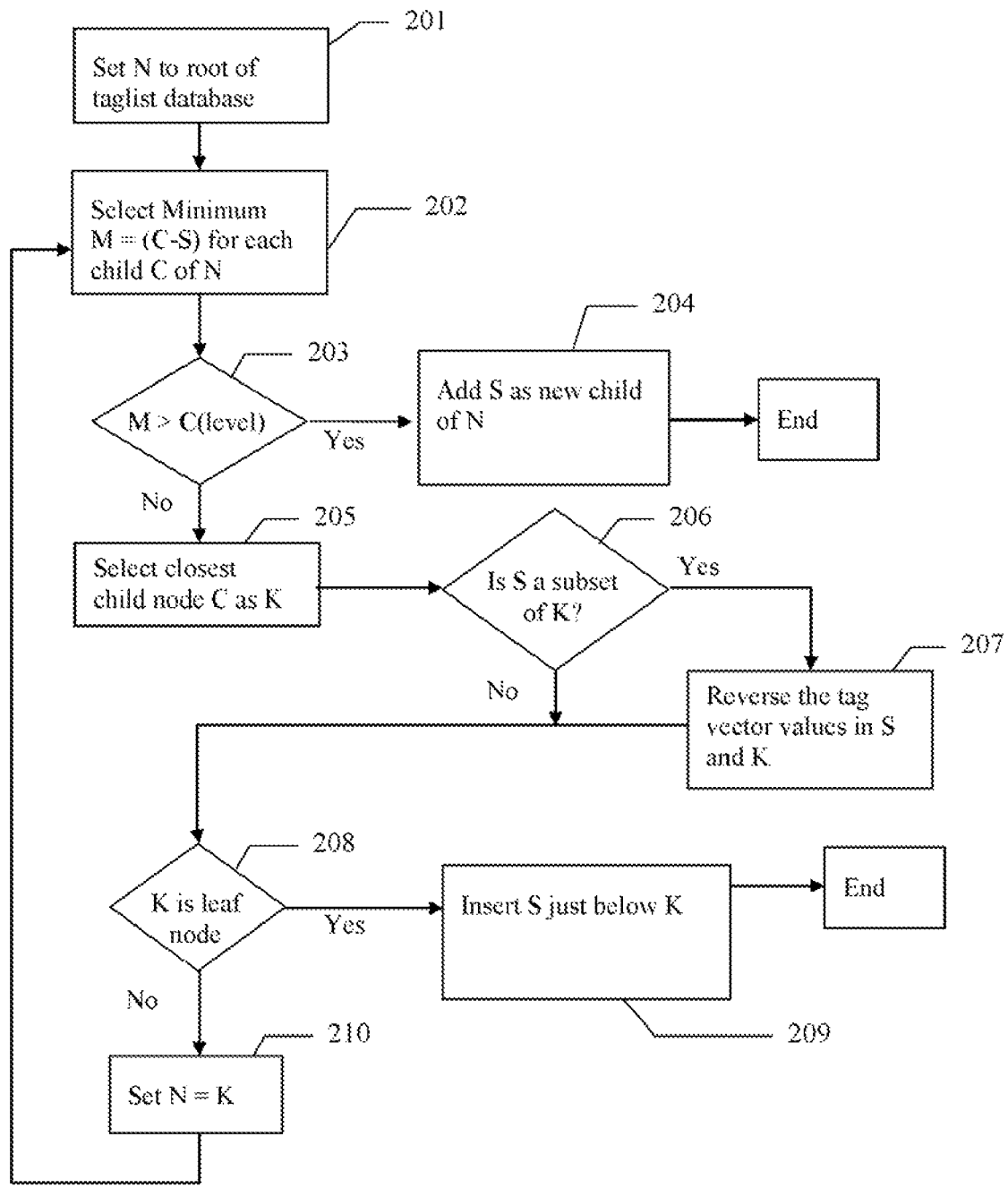
FIG. 2 is a flowchart of the method of inserting a taglist into the data tree in one embodiment of the invention.

FIG. 2 describes the insertion of a taglist, or more precisely a node S which corresponds to the vector represented by the taglist, into the database.

In step 201 the database system sets a node level value N to be the root level of the database.

As above, the distance between two vectors x and y is represented as $\|x-y\|$. Since nodes may also be represented by vectors as above, the distance measure between two nodes is the distance between the corresponding taglist vectors for those nodes. In step 202 the system computes the distance value M between the taglist vector, i.e., a potential node S as a child of root level N, and each existing child C of root level N, calculating the distance $M=\|C-S\|$ for each C. The minimum calculated value of M is selected, as this represents the node C that is the most likely fit for the taglist at this level.

In step 203, the system compares C(level) at this level with the minimum value of M selected. If the minimum value of M is greater than C(level), then S is not considered to be close to any of the children C of root level N. In this case, the system proceeds to step 204 where it adds node S as a child of N and the process ends.

If the minimum value of M is less than or equal to C(level), at step 205 the system selects the child node C at this level that was used to calculate the minimum M, i.e., that is within C(level) of S; the selected child node C is now designated as node K.

Next there is a test whether S is a subset of K at step 206. If S is not a subset of K, the system proceeds to step 208. If S is a subset of K, at step 207 the system reverses the tag vector values of the nodes S and K, making the smaller tag-vector set come first in the tree structure. The system then proceeds to step 208.

At step 208 the system checks whether node K is a leaf node, i.e., a node having no children; if node K is a leaf node, the process proceeds to step 210 where it inserts node S just below node K and then ends. At this point, node K is no longer a leaf node, as it now has a child node S.

On the other hand, if node K is not a leaf node, i.e., it already has children of its own, the system proceeds to step 210 where it continues the recursive process by setting node K to the new node N and returning to step 202. The process is now repeated at the next level, now looking at the children of node K, and comparing the next item in the taglist vector as the new S which is either to be included in one of the children nodes of node K or inserted as a new child node itself.

The process repeats until a new node is inserted in the database, either because the next keyword in the taglist is not close enough to any of the existing nodes at that level or because every keyword in the taglist has been compared to a level in the database, and the appropriate location has been found to enter the new taglist.

Alternatively (or in addition), the new node may contain information about the user who submitted the taglist. If the new node is simply user information, since a user may submit multiple taglists to represent multiple interests, it will generally be more efficient to enter a user's information only once rather than creating multiple nodes each containing the repetitive information for the same user. Instead of entering the actual user information in the database, it may be more efficient to include in the new node a pointer to a memory location where the user's information may be found rather than a full copy of the information. One embodiment of a user database is described below.

Note that if a tag vector uses a set representation, as described above, where the closer vectors have a higher closeness number rather than a smaller one, then in the above steps the inequalities will be reversed as well as the use of maximum instead of minimum values.

Locating Users with Similar Interests by Tag List Matching

When a user wishes to search for other users with matching interests, the user may submit a search taglist representing the interest for which matches are sought, which results in a vector S. The user may also specify a closeness value d, or, in some embodiments, the system may use a predefined default value for d. The database system uses the following procedure to perform the search:

The system does a left-to-right recursive walk down the database tree, at each level selecting those nodes that are within the specified closeness distance d to S. The walk continues to search down a subtree if the node N that is at the root of the subtree is within d+e of S, where e is the closeness level value C(level) at this level of the tree. Each node readied during the walk is entered into a list. The matching values to be returned are those in the list at the end of the search down the selected branches of the tree.

Adding the closeness value e at each level to the specified closeness level d of the search when choosing which subtrees to search down insures that the system collects all of the relevant matches within available subtrees. If during the insertion process each child node C of a subtree has been placed within the closeness distance e of the root node N of that subtree at that level, then that subtree should be visited for matching if S is within distance d+e of the root node N. The sufficiency of this choice is based on the triangle inequality of metric spaces which states specifically that if:

$$\|C-S\| \leq d$$

and $$\|N-C\| \leq e$$

then $$\|N-S\| \leq d+e$$

This means that to insure the search of a child node C below root node N by comparison with S, it is sufficient if we search below N when the distance from S to N is less than or equal to d+e.

Figure 3:
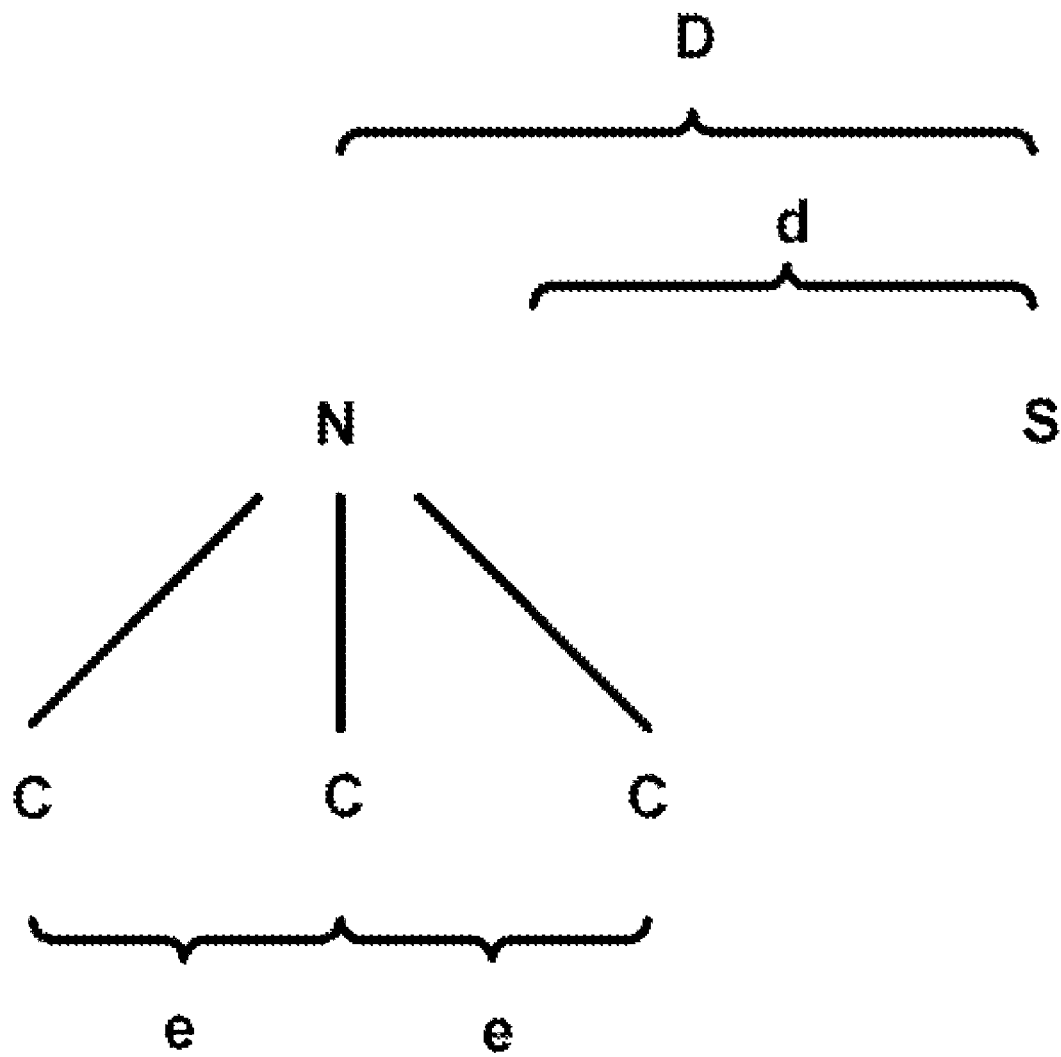
FIG. 3 is a diagram showing how the distance between vectors is related to the scope of a search of the data tree in one embodiment of the invention.

A simplified diagram of this principle is shown in FIG. 3. There is a particular node N at the root of a subtree in the taglist database. The desired keyword, i.e., vector, S is a distance D from root node N, and not within the specified closeness distance d under the measure described above, and thus it appears that the subtree of node N should not be searched. However, each child node C of root node N is within a closeness distance e of root node N. If the distance e to a particular child node C is in the "direction of" S, i.e., it reduces the distance between the vectors represented by node C and root node N, then the distance between that child node C and S may be less than D as illustrated in FIG. 3. Thus, to insure that such an child node C is searched, it is simplest to search all root nodes N within the distance d+e of S, rather than to try to find only those child nodes C of root node N that are within distance d of S.

As discussed above, each leaf node that identifies a user represents a taglist or vector of the indicated interest area, and in searching the goal is to match the search taglist S and identify users (or documents, projects, etc.) with interests matching S. As also discussed above, in some embodiments the identity of the users (or documents, projects, etc.) may be located in a separate user database, and each leaf node may contain a pointer to the user to whom the represented taglist belongs. Thus, any matching taglist or vector found in a taglist database may be used to identify the associated user by using a pointer to the user database. (Again, in a relational database, these functions may be combined.)

Again as discussed above, any convenient order of tags or keywords may be selected, although in some embodiments the system either encourage users to select tags in a particular order or from a predefined list, while in other embodiments the system may attempt to place the tags in an appropriate order for a search to be properly conducted.

In some cases it may be desirable to delete a specific taglist. This is done by finding the exact taglist desired by performing a minimum value search as described above, i.e, by looking for the closest node to each keyword in the taglist, and then deleting the resulting match by using a standard tree structure delete. It may also be desirable to update intermediate non-leaf taglists above the deleted node. Deletion of an item from a database having a tree structure is well known in the art.

The User-Taglist Relation

A separate function may be provided for determining which users are associated with a particular taglist vector. In one embodiment this is implemented as a binary tree of taglist vectors where the tags are ordered alphabetically. With the tags ordered alphabetically, the taglist vectors are then ordered lexicographically. In this case each taglist is treated like a letter, since the taglists can be given an alphabetic ordering. This enables a binary tree where the nodes are taglist vectors. Such a binary tree allows the fast lookup of data associated with a taglist vector. The data associated with a taglist vector in this case is a list of users that have selected that taglist vector as representing an interest area.

The taglist vector (afghan, antique) comes before (afghan, spread) and (antique, doll) for the purpose of placement in this binary tree. Each taglist vector in this tree will be associated with a list of users who have registered that taglist by virtue of a leaf node at the end of the vector containing user information or a pointer to such. This provides a separation of function so the taglist database only needs to deal with taglists, not users. This tree for tracking user tag vectors may be referred to as a user database.

To add a user-taglist vector (u, t) pair to the user database, a standard binary-tree search is used to find the tag vector t in the user database tree or to add the tag vector t if it is not already present. The user name u is then added to the user name list at that tag vector node, again possibly by means of a pointer to a memory location containing the user information.

To remove a user-taglist vector (u, t) from the user database, as with removing a taglist from the taglist database above, the taglist vector node associated with t is located in the user database, and then the user name u (or pointer) is removed from the user list at that node. If that action leaves the user list at that node empty, then the system may optionally also remove the taglist vector t from the user database, and may even remove the corresponding taglist vector from the taglist database.

Change Notifications

As mentioned above, in some environments such as enterprises, the taglist database may also contain interest taglist vectors associated with documents, projects and other files, as well as those taglists entered by individuals. In the case of documents and certain other types of files, tools are available to scan such files and locate the keywords that may be used to create a taglist vector. Even if such tools are not available or desirable for some reason, taglist vectors may be created and assigned manually for documents, projects or files, as well as individuals.

If a new document, file or project is created with an associated tag vector, or a user enters a new taglist, the taglist database may be used to find those individuals who appear to be interested in the new item. To do this, the new taglist vector may be used to find close taglist vectors in the taglist database, and in turn the individuals associated with the close taglist vectors. These individuals may then be notified of the new item, whether it is a new document, file, project or user.

Similarly, if a change is made to an existing item, that item's taglist vector may again be used to find those who would be interested based on the closeness of the taglist vector of the item and the taglist vectors of the users. Those who are likely to be interested in the change to the item may then be notified.

Moderators

As explained herein, the taglist database may be used to identify individuals with a particular interest, and in some instances the search for such persons may be for the purpose of starting an interest group devoted to that interest. A person who organizes and/or runs an interest group is commonly termed a moderator. A moderator may or may not be the person who has defined the subject area for the group, and a single group may have more than one moderator. Moderators often have the ability to remove people from their group and/or to act as a gatekeeper for those seeking entry into the group.

An interest group may have various rules or permissions settings. Typically such permissions are under the control of the moderator or moderators for the interest group, and may differ for moderators and other members. There may be settings to control the sending or receiving of messages, for example, so that only moderators can send messages to the entire group while other members may only send messages to other individual members. There may be rules determining whether someone desiring to join a group can do so automatically, possibly after registering, or whether joining requires the approval of a moderator. Rules or permissions may be set to obtain a desired effect; for example, if anyone can join a group automatically, and if moderators can send messages to the entire group, then anyone joining the interest group would be automatically signing up to receive any and all messages sent by the moderator or moderators of the interest group.

The moderators for a particular website or organization may also be given a special search visibility, such that a user may ask that moderators be the most highly ranked results, or even the only results, to a search. Such a visibility may allow a visitor to the website to search the taglist database for the moderator with the best interest fit, rather than requiring the user to search through all of the users having the combined interests of each interest group. For instance, a user might be able to more quickly identify a group oriented around an interest of the user by identifying the moderator than by searching for other users with the same interest. In another application, such a search visibility might allow visitors to a real estate website to locate the best agent or agents that best match their needs. Similarly, visitors to a website with multiple blogs may enter a taglist to more quickly find those blogs that best match their interests by searching for the bloggers whose taglists most closely match the entered taglist.

A Central Database

If desired, a central server website (known as the Hello-Central website in a commercial embodiment) may be provided which allows interest groups to register with the central website, and allows users to log in and create taglist vectors to find those interest groups as they would find other users with similar interests. The taglist vectors created at the interest group client websites may be migrated to the central server website database, but with only the client website identification provided instead of the identification of the actual users from the client website.

If a user on the central website does an interest group search that matches taglist vectors from a client website, the user can be transferred to the client website where the interest group users may be available for contact or discussion.

Thus, in this approach traffic on the central website is transferred to the client websites if there are matching interest groups on the client websites. However, if no matches are located from a client website, then users on the central website may be permitted to create an interest group there without transferring to a client website.

The invention has been explained above with reference to several embodiments. Other embodiments will be apparent to those skilled in the art in light of this disclosure. The present invention may readily be implemented using configurations other than those described in the embodiments above, or in conjunction with systems other than the embodiments described above. For example, while the inclusion of documents and other types of files in the database tree structure has been described herein, it would be possible to use the present invention as a way of characterizing, storing and retrieving documents in a database that does not include user's designation of interest areas.

It should also be appreciated that the present invention can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the invention.

These and other variations upon the embodiments are intended to be covered by the present invention, which is limited only by the appended claims.

What is claimed is:

1. A method allowing users of an information system to identify other users having similar interests comprising:
   storing keyword lists representing user interests in a hierarchical database containing a plurality of stored keyword lists, the database comprising nodes corresponding to the keywords of the stored keyword lists;
   adding a new keyword list to the hierarchical database by inserting the new keyword list at a point of the new keyword list's closest match to an existing keyword list by:
   comparing a first keyword of the new list to the nodes at a first level of the database to determine whether the first keyword is close enough to an existing node at the first level for the new list to be placed within the existing node;
   if the first keyword is close enough to fall within an existing node at the first level, repeating the comparison for the next keyword to the nodes at a level under the existing node;
   repeating the comparison for each subsequent keyword at each subsequent level until a keyword is not close enough to be placed within an existing node; and
   when a keyword is not close enough to fall within an existing node at the level at which it is compared, creating a new node corresponding to the keyword under the last node for which a keyword was close enough to be placed within the node.

2. The method of claim 1, further comprising creating subsequent nodes below the newly created node, each subsequent node corresponding to any remaining keywords in the new keyword list and being under the node corresponding to the preceding keyword in the list.

3. The method of claim 1, wherein creating a new node further comprises providing identification of a user with whom the new keyword list is associated.

4. The method of claim 1 further wherein:
   the keyword lists are weighted keyword lists each represented as a vector;
   wherein said comparing comprises comparing the first element of the new keyword vector to the nodes at a first level of the database to determine whether the first element is close enough to an existing node at the first level for the new list to be placed within the existing node;
   if the first element is close enough to fall within an existing node at the first level, repeating the comparison for the next element to the nodes at a level under the existing node;
   repeating the comparison for each subsequent element at each subsequent level until an element of the new keyword vector is not close enough to be placed within an existing node; and
   when an element of the new keyword vector is not close enough fall within an existing node at the level at which it is compared, creating a new node corresponding to the element under the last node for which an element was close enough to be placed within the node.

5. The method of claim 4 wherein determining whether an element is close enough to an existing node for the new list to be placed within the existing node is determined by comparing the distance between the vector represented by the new list and the vector represented by the existing node.

6. The method of claim 5 wherein:
if the distance between the vector represented by the new list and the vector represented by the existing node is less than a specified closeness value the keyword is considered close enough to be placed within the existing node.

7. The method of claim 6 wherein the closeness value is a predetermined value.

8. The method of claim 6 wherein:
the closeness value for any child node is a predetermined function of the closeness value of the nodes parent such that the closeness value is different for each level in the database; and
the closeness value of one level is predetermined and the values of the other levels are calculated using the predetermined function.

9. The method of claim 6 further comprising:
allowing users to enter one or more keyword lists of their own interests,
wherein users may enter a search keyword list indicating an area of interest in which the users wish to find other users with similarly close interests; and
comparing the search keyword list selected by the user with the other keyword lists stored in the database and returning a list of the closest matching users (e.g., users with the closest matching keyword lists) while at each level the system will select the most nearby neighborhoods to zero in on the closest matches.

10. The method of claim 4 wherein the weighted keywords are represented as elements of vectors and determining whether a weighted keyword matches an existing node is determined by comparing the distance between the vector represented by the search list and the vector represented by the existing nodes in the database.

11. The method of claim 10 wherein if the distance between the vector represented by the search list through a particular keyword and the vector represented by the existing node is less than a specified closeness value the existing node is considered to match the search list.

12. The method of claim 1, further comprising:
searching the hierarchical database for keyword lists matching a search keyword list by:
comparing the first keyword of the search list to the nodes at a first level of the database to determine whether any existing nodes match the first keyword;
if one or more nodes match the first keyword, repeating the comparison for the next keyword to the nodes at the level which is directly under the nodes matching the first keyword;
repeating the comparison for each subsequent keyword at each subsequent level until the nodes closest to the search list are located; and
returning a list of the located nodes.

13. The method of claim 12 wherein returning the list of located nodes further comprises returning the closest matching nodes in the order of their closeness to the search keyword list.

14. The method of claim 12 wherein returning the list of located nodes further comprises returning a predetermined number of the closest matching nodes.

\* \* \* \* \*